July 13, 1954
S. T. STOLESON
2,683,642
FISHING TACKLE CASE
Filed June 26, 1950
2 Sheets-Sheet 1
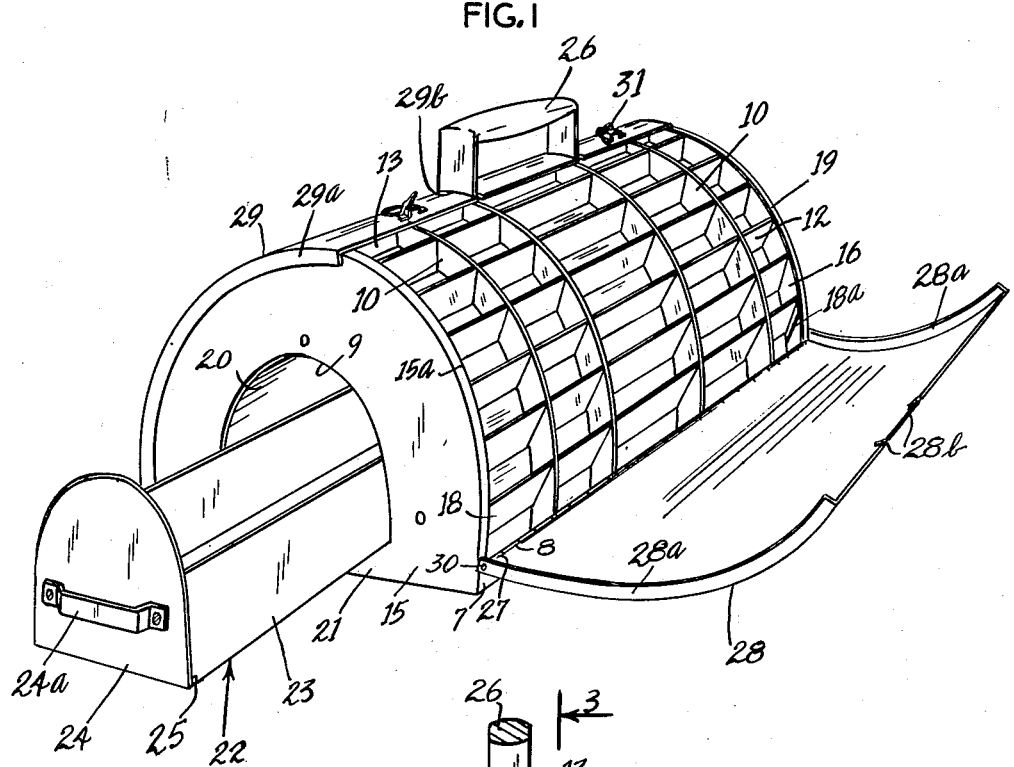
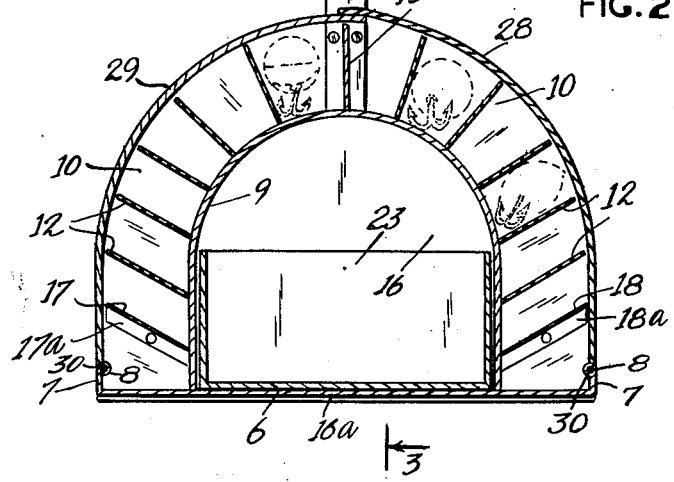
INVENTOR
STEPHEN T. STOLESON
BY
Williamson & Williamson
ATTORNEYS July 13, 1954   S. T. STOLESON   2,683,642
FISHING TACKLE CASE Filed June 26, 1950   2 Sheets-Sheet 2

INVENTOR
STEPHEN T. STOLESON
BY
Williamson & Williamson
ATTORNEYS

Patented July 13, 1954

2,683,642

UNITED STATES PATENT OFFICE 2,683,642

FISHING TACKLE CASE

Stephen T. Stoleson, Minneapolis, Minn.

Application June 26, 1950, Serial No. 170,290

6 Claims. (Cl. 312—244)

This invention relates to a fishing tackle case.

Every fisherman who utilizes artificial lures and baits is confronted with the need for a means of transporting and storing his various individual lures which is designed to make these lures readily accessible and simultaneously viewable, and to preclude these lures from intermingling with each other when their container is inverted or tumbled. Any contact of these lures between each other and any appreciable movement thereof within the tackle case is undesirable since it results in scratching and marring of the lures with resultant diminishing of the effectiveness of the lures. Because of the limited space within the ordinary boat used for fishing, it is imperative that the tackle case be as compact as possible, and yet provide space for all of the fisherman's lures, reels and bobbers. It is also imperative that the tackle case be constructed to preclude the entrance of rain when the case is closed. Many types of fishing tackle boxes have been previously constructed but each of these sacrifices at least one of the above features for the other.

It is a general object of my invention to provide a novel and improved fishing tackle case of cheap and simple construction.

A more specific object is to provide a fishing tackle case constructed to provide individual compartments for each lure to be stored therein and to preclude shifting and consequent intermingling of these lures.

Another object is to provide a fishing tackle case capable of accommodating a large number of lures, reels and bobbers and at the same time having a high degree of compactibility.

A further object is to provide a fishing tackle case with cover means constructed to permit each of the fishing lures stored therein to be readily made simultaneously viewable and accessible, and constructed to effectively preclude the entrance of rain into the interior of the case.

These and other objects and advantages of my invention will more fully appear from the following description made in connection with the accompanying drawings, wherein like reference characters refer to similar parts throughout the several views and, in which:

Fig. 1 is a perspective view of one embodiment of the invention with the tray in extended position;

Fig. 2 is a transverse sectional view of the case;

Figure 3:
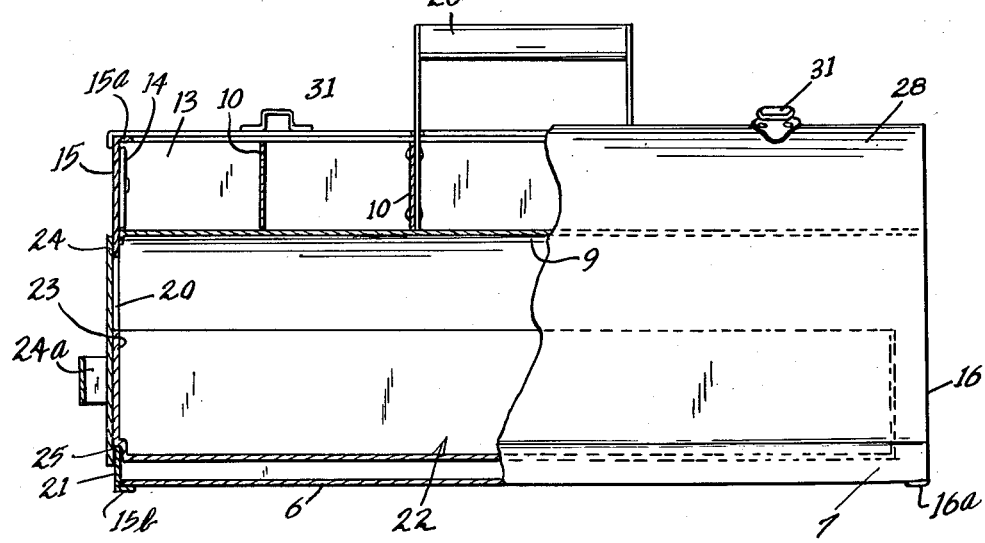
Fig. 3 is a side elevational view of the case with a portion thereof shown in section substantially along lines 3—3 of Fig. 2.

One embodiment of my invention as shown in Figs. 1-3 includes a rectangularly shaped bottom 6, the side portions 7 of which are turned upwardly at right angles. The upper edges of the upstanding sides 7 have portions blanked out with the remaining portions formed into an inwardly extending loop indicated at 8. Mounted midway between the upstanding side portions 7 is a substantially semi-cylindrically shaped hood member 9. This hood member 9 may also be described as being an inverted horseshoe shaped plate. The lower edges of the sides of the hood shaped member 9 are secured to the bottom plate 6 by welding or other suitable means.

Mounted as hereinafter described about the circumference of the hood member 9 are a plurality of inverted horseshoe shaped spacer plates 10 which are formed concentrically with the hood. Each of the spacer plates 10 has formed in its outer edge a plurality of downwardly extending and substantially radial half slots. These spacer plates 10 are arranged transversely of the hood and in overhanging and registering relation thereto as best shown in Figs. 1 and 2.

Mounted in the half slots of the spacer plates 10 are a plurality of longitudinally extending dividing plates indicated generally as 12. These plates 12 are half slotted and equal in length to the hood member 9 and the bottom 6. The uppermost dividing plate 13 is provided with a flange 14 at each of its ends which extends at right angles to the dividing plate 13 and is secured to one of the end plates 15 or 16 by riveting, spot welding or some other suitable means. The two lowermost dividing plates 17 and 18 are provided with similar flanges 17a and 18a. These flanges 17a and 18a are secured to the end plates by riveting, spot welding or some other suitable means. These flanges 14, 17A, and 18A serve to anchor the entire compartmental framework shown in Figs. 1 and 2 to the hood member 9 and the bottom 6.

The end plate 16 is made of a solid plate shaped concentrically with the cross-sectional shape of the combined hood 9 and the dividing and spacer plates 10 and 12. An inwardly extending flange 19 is formed all along the periphery of the end plate 16. This flange 19 is formed to aid in retaining the longitudinally extending dividing plates 12 in place. The end plate 16 is secured to the bottom 6 by an inwardly extending flange 16a which is secured to the bottom plate by welding (rivets), or in some other suitable manner.

The opposite end plate 15 has an overall shape concentric with that of the end plate 16. It also has an inwardly extending flange 15a. However, formed in the central portion of the end plate 15 is an aperture 20 which is substantially concentric with the interior of the hood 9, except for a slight ridge 21 which is left upstanding from the bottom 6 to provide means for retaining the drawer 22 in its proper position. The end plate 15 has a flange 15b which is welded or otherwise suitably secured to the bottom 6 to hold the entire end plate rigid relative thereto.

The drawer 22 consists of a tray 23 of generally rectangular shape which is provided with an end piece 24 secured thereto by riveting, spot welding, or other similar means. The end piece 24 is secured to the tray 23 in a slightly spaced relation so as to leave a slight channel 25 between the two members adapted to receive the upstanding rib 21 when the drawer 22 is placed in closed position. Secured to the outer surface of the end piece 24 is a handle member 24a.

Secured to two of the spacer plates 10 is a handle 26. This handle 26 is rigidly secured by means of rivets or welding and is disposed centrally of the hood 9 and its surrounding structure.

Secured to the loop 8 of the upstanding portions 7 of the bottom 6 by means of complementary loops 27 formed along their lower edges is a pair of arcuately shaped cover members indicated generally as 28 and 29. These cover members 28 and 29 are pivoted relative to the hood 9 and the dividing and spacing plates 10 and 12 by means of a pivot pin 30 which extends through the loops 8 and the loops 27. Each of the covers 28 and 29 have inwardly turned flanges 28a and 29a which fold over the end plates 15 and 16 when in closed position. The cover member 29 is provided with a pair of slots 29b to accommodate the handle 26. The cover member 28 is provided with a similar pair of slots 28b to accommodate the handle so that the two cover members will rest in overlapping relation when closed. The cover member 29 and 28 is provided with a pair of clasps indicated generally as 31, one of these clasps being disposed on each side of the handle 26. These clasps are of the conventional type used to draw covers or trays of this type tight and to hold them in locked position.

It can readily be seen that my fishing tackle case provides a plurality of individual compartments which are especially well adapted for receiving and storing individual lures therein. These compartments, as shown, extend downwardly and inwardly and face outwardly. They are adapted to receive the lures with the hooks extending downwardly beneath them. Each compartment is adapted to receive a single lure therein. The tray 22 is adapted to carry and store the reels and bobbers of the fisherman.

By constructing my fishing tackle case with each of its compartments facing outwardly and being arranged substantially radially around the periphery of the hood member 9, I have provided a case which makes the individual lures all simultaneously viewable and accessible when the covers 28 and 29 are opened. It is an easy matter for the fisherman at a glance to select the lure which he desires to use without engaging in the time-consuming activity of removing certain lures in order to see what lies beneath them. My fishing tackle case makes each and every lure carried by the fisherman instantly viewable for selection and readily accessible.

When the covers 28 and 29 are closed and locked in position by the clasp 31 they act to positively prevent the escape of the individual lures from the compartments and to thereby prevent their intermingling. By maintaining these lures in separate compartments the usual scratching of the surfaces of the lures and their entangling, normally attendant with their intermingling, is eliminated. The covers are formed so as to register with the outer edges of the compartments, thereby preventing the escape of the individual lures. By placing the lures with their hooks downwardly the fisherman is assured that the body of the lure will not be scratched thereby, since the lures are held substantially immovable within their compartments.

The flanges 28a and 29a of the covers 28 and 29 extend downwardly over the edges of the end plates 15 and 16 to preclude the entrance of rain adjacent these portions. The inwardly extending slots 28b and 29b of these covers provide for overlapping of the same at their upper edges and thereby preclude the entrance of rain through the upper portion of the case. As a result the fisherman's lures are at all times maintained in a dry condition while resting in one of the compartments of the case.

It should be noted that my fishing tackle case is extremely compactible. There has been a maximum utilization of the space consumed by the case. The entire periphery of the hood member 9 has been utilized to provide a bottom for each of the individual compartments provided for the lures. The central portion of the hood member 9 has been utilized to receive the tray 22 which is adapted to store the fisherman's reels and bobbers.

The central disposition and securance of the handle member 26 to the upper dividing plate 12 is a distinct advantage over most fishing cases. It should be noted that it is possible to carry my fishing case with both of the covers open if desired without danger of the case tilting or tipping and consequent disarrangement of the lures. The downwardly extending feature of each of the compartments, of course, aids in preventing the lures from falling out of their compartments.

It will, of course, be understood that various changes may be made in the form, details, arrangement and proportions of the various parts without departing from the scope of my invention.

What I claim is:

1. A fishing tackle case comprising a rigid elongated body having convexly shaped top and side surfaces, said body having a plurality of relatively small outwardly facing compartments circumferentially and longitudinally aligned along said top and side surfaces, and sectional cover means swingably secured to said body for simultaneously closing and opening said compartments, the sections of said cover being individually swingable to opened and closed positions and in opposite directions and having side edges meeting along the body when closed.

2. A fishing tackle case comprising a rigid substantially semi-cylindrically shaped body, said body having a plurality of relatively small circumferentially and longitudinally distributed compartments and having a relatively large hollow compartment with an open end disposed centrally of said body and extending longitudinally thereof, and sectional cover means swingably secured to said body for simultaneously closing and opening said circumferentially disposed compartments, the sections of said cover being swingable in opposite directions when opened and meeting along the top of the body when closed.

3. A fishing tackle case comprising a rigid substantially semi-cylindrically shaped body, said body having a plurality of substantially radially arranged and circumferentially disposed compartments, each of said compartments extending inwardly and slightly downwardly and being aligned longitudinally with other compartments, and sectional cover members swingably secured to said body and each simultaneously opening and closing only a predetermined number of said compartments, said cover members when closed having side edges meeting along the body and being adapted to positively preclude any fishing lures placed in separate compartments from intermingling with each other when the body is inverted or tumbled.

4. A fishing tackle case comprising an elongated body having side wall portions and a transversely arcuate upwardly bowed top portion connecting upper ends of the side wall portions, a flat bottom for said body having side portions projecting from opposite sides of said body and provided with upstanding marginal flanges, end plates carried by opposite ends of said body and projecting laterally from the body and having marginal edges conforming to the transverse contour of the body, one end plate being formed with an opening registering with an end of the body and constituting an entrance for a chamber defined by and extending longitudinally in the body, strips extending along the outer surface of said body longitudinally thereof between the projecting portions of the end plates and spaced transversely from each other, other partitions extending along the outer surface of said body transversely thereof and intersecting the longitudinal strips and together therewith defining compartments open at their outer ends, the longitudinally extending partitions being disposed in such upwardly angular relation to the body that articles placed in the compartments cannot fall from the compartments through open ends thereof, closure plates hinged along lower side edges to said flanges for swinging upwardly and inwardly to a closed position and when closed having upper side edges meeting in overlapped relation to each other along the top of the body, latches releasably holding said closure plates closed, a handle carried by the upper edge portion of one closure plate, a tray slidable longitudinally into and out of said chamber through the open end thereof, and a facing plate for the outer end of said tray having portions projecting therefrom and engaging the outer surface of the adjacent end plate and constituting a closure for the opening therein when the tray is in a closed position.

5. A fishing tackle case comprising an elongated hollow body of stiff material having side wall portions connected by a transversely arcuate upwardly bowed upper wall portion, a stiff bottom for said body having opposite side edge portions projecting laterally from said body, end plates mounted against ends of said body and having marginal portions projecting from side walls and the upper wall thereof, one end plate being formed with an opening constituting an entrance at one end of a chamber within the body, partitions between the projecting portions of the end plates dividing space about the body between the end plates into a plurality of compartments, closure plates for said compartments disposed at opposite sides of said body, said closure plates being hinged along lower side edges to opposite side edges of said bottom for swinging movement upwardly and inwardly to a closed position in which upper side edges meet along a line midway the width of the body, a handle extending upwardly from the upper edge portion of one closure plate, and a tray introduced into said chamber through the end plate having the opening therein and having a member at its outer end serving as a closure for the opening in the said end plate when the tray is thrust into the chamber its full length.

6. A fishing tackle case comprising a hollow body defining a chamber therein, said body being dome shaped in cross section and having side wall portions connected by an arcuate upper wall portion, a bottom for said body having opposite side edge portions projecting from opposite sides of the body, end walls for the body having portions projecting laterally therefrom and together with the body and the projecting portions of the bottom forming an article-receiving space about the body, closure plates for the article-receiving space hinged along lower side edges to opposite side edges of said bottom for vertical swinging movement to opened and closed positions, said closure plates when closed having upper side edges contacting along the top of the body, one end plate having an opening constituting an entrance to the chamber in the body, and a tray introduced into said chamber through said entrance, the outer end of the tray having a portion engaging portions of the said end wall about the entrance opening and constituting a closure for the entrance opening when the tray is fully positioned in the chamber.

References Cited in the file of this patent

UNITED STATES PATENTS

| Number | Name | Date |
|---|---|---|
| D. 11,058 | Brown | Mar. 11, 1879 |
| 1,061,386 | Lamb | May 13, 1913 |
| 1,165,304 | Whittaker | Dec. 21, 1915 |
| 2,585,745 | Crosby | Feb. 12, 1952 |